(12) United States Patent
Chang et al.

(10) Patent No.: US 8,803,805 B2
(45) Date of Patent: Aug. 12, 2014

(54) COMPUTER INDEXING DEVICE

(75) Inventors: Po Chang, New Taipei (TW); Yi-Chung Hsu, New Taipei (TW)

(73) Assignee: Golden Emperor International Ltd., New Taipei (TW)

( * ) Notice: Subject to any disclaimer, the term of this patent is extended or adjusted under 35 U.S.C. 154(b) by 517 days.

(21) Appl. No.: 13/228,657

(22) Filed: Sep. 9, 2011

(65) Prior Publication Data

US 2012/0092257 A1    Apr. 19, 2012

(30) Foreign Application Priority Data

Oct. 13, 2010    (TW) ............................... 99219750 U (51) Int. Cl.
  *G06F 3/033*    (2013.01)
  *G09G 5/08*    (2006.01)

(52) U.S. Cl.
  USPC .......................................... 345/166; 345/163

(58) Field of Classification Search
  CPC ................................................ G06G 3/03544
  See application file for complete search history.

(56) References Cited

U.S. PATENT DOCUMENTS

| | | | | |
|---|---|---|---|---|
| 4,754,268 A | * | 6/1988 | Mori | 345/163 |
| 6,219,037 B1 | * | 4/2001 | Lee | 345/167 |
| 2005/0095697 A1 | * | 5/2005 | Bachur et al. | 435/287.2 |

* cited by examiner

*Primary Examiner* — Alexander Eisen
*Assistant Examiner* — Mark Regn
(74) *Attorney, Agent, or Firm* — Rosenberg, Klein & Lee (57) ABSTRACT

Disclosed is an indexing device. A first sensing unit, a second sensing unit, and a control unit are primarily disposed in the indexing device. The control unit couples to the first sensing unit and the second sensing unit. The control unit receives a first move detection signal outputted by the first sensing unit, and receives a second move detection signal from the second sensing unit. The variance of the first move detection signal and/or the second move detection signal is referred to compute a cursor control signal. Further, the first sensing unit or the second sensing unit is slidably disposed in the device's casing. This movable sensing unit allows the cursor control correlated to the moving indexing device more accurate, more stable and/or faster responsive to the user's operation.

11 Claims, 9 Drawing Sheets

COMPUTER INDEXING DEVICE

BACKGROUND OF THE INVENTION

1. Field of the Invention

The instant disclosure is related to an input device, more particularly to a computer mouse capable of controlling a cursor's movement.

2. Description of Related Art

The general computer mouse is primarily used to control the cursor's move on a screen. The computer mouse is also accompanied with some additional functions for matching the requirements to the various users' operations. Many different types of computer mice directed for the various requirements have been developed.

Nevertheless, the general purpose of the computer mouse is provided for the user to operate the cursor more accurate, and more convenient to conduct the manipulation.

There is still a drawback that the traditional computer mouse lacks flexible configuration for some specified requirements since it is usually designed for a general use.

SUMMARY OF THE INVENTION

The invention discloses an indexing device preferably a computer mouse. The indexing device is allowed to have more accurate detection of movement, more stable controlling and/or faster reaction to the movement by means of a plurality of photo sensors.

In accordance with one of the embodiments in the disclosure, the indexing device includes a first sensing unit, a second sensing unit, and a control unit. The first sensing unit generates a first move detection signal, and as well the second sensing unit generates a second move detection signal to the control unit. The control unit couples to the first sensing unit and the second sensing unit, and operates to generate a cursor control signal in response to the variance of the first and second move detection signals.

The mentioned embodiment provides some following advantages:

The pluralities of sensor units are provided to the indexing device to have more accurate detection of its movement. The device therefore allows users to control the cursor more accurate, and the maneuverability will not be obviously affected by the extrinsic factors. Faster reactive movement is also provided.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
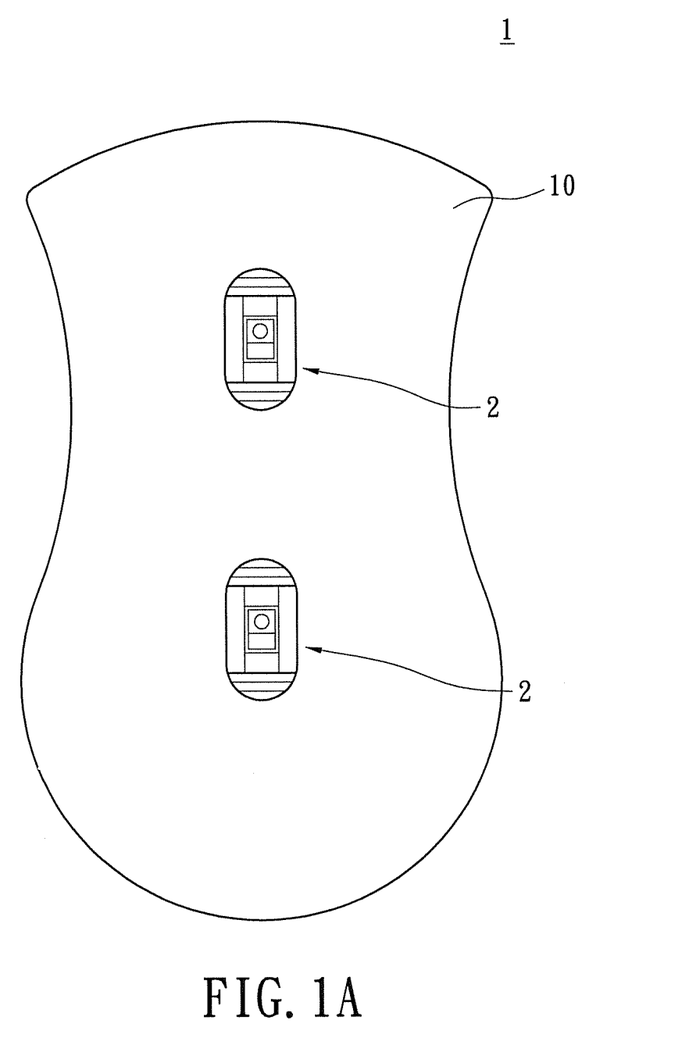
FIG. 1A shows a schematic diagram of a computer mouse according to one of the embodiments of the present invention.

Reference is made to FIG. 1A showing a schematic diagram of the computer mouse in accordance with the present invention. The shown computer mouse 1 is preferably for performing indexing on a screen of the computer system. Pluralities of sensing units are disposed in one body of the computer mouse 1, preferably onto a casing 10 thereof. In an exemplary embodiment, two sensing units 2 are disposed at one side (for example, bottom of the device) of the casing 10 of the computer mouse 1. The sensing unit 2 detects the move of the computer mouse 1 by means of a light signal, for example the visible or invisible light signals. The plurality of sensing units 2 of the computer mouse 1 are controlled by means of an inside firmware based on multiple sensing results, and thereby the more accurate action detection, more stable controlling, and/or faster response can be obtained. Alternatively, the user may further select one of the sensing units 2 as the primary sensor due to the user's personal operating behavior.

Figure 1B:
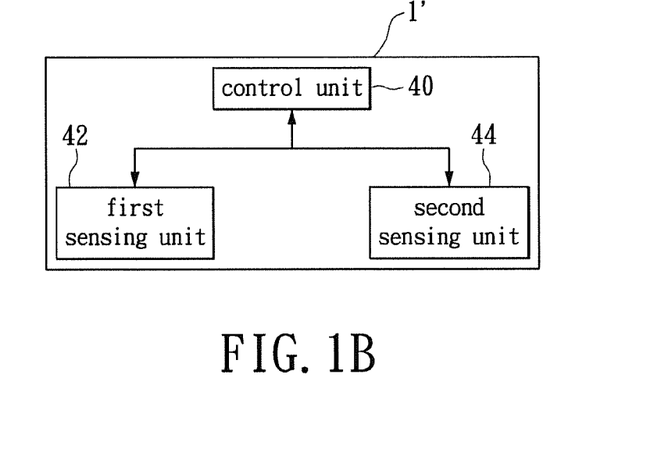
FIG. 1B shows a block diagram illustrating the indexing device in accordance with the present invention.

Reference is made to FIG. 1B showing the block diagram of the indexing device of the present invention. A computer mouse 1' includes a control unit 40, a first sensing unit 42, and a second sensing unit 44. The control unit 40 respectively couples to the first sensing unit 42 and the second sensing unit 44. Both the first sensing unit 42 and the second sensing unit 44 are used to detect the movement of the computer mouse 1'. Further, the control unit 40 then outputs a cursor control signal for the data processor (such as the computer system) in response to the detection result made by the first sensing unit 42 and the second sensing unit 44. The cursor control signal drives the computer mouse to move. It is worth noting that the operating mode of the computer mouse 1' allows to simultaneously initiate the multiple sensing units or to initiate a single sensing unit.

For example, while both the first sensing unit 42 and the second sensing unit 44 of the computer mouse (indexing device) 1 act under the operating mode, the control unit 40 may receive a moving signal from the detection made by the first sensing unit 42, so as to acquire a first move detection signal. With the moving detection made by the second sensing unit 44, a second move detection signal is then acquired. The control unit 40 then performs analytic operation according to the two sets of move detection signals, and optimizes the move detection signals. The optimization is provided to eliminate the effect caused by the abnormal action from one of the sensing units (2). For instance, the detection of sensing unit may be affected if it is contaminated with dust. Through the algorithm, the control unit 40 acquires the cursor control signal which is able to improve the accuracy of move detection of the computer mouse.

Figure 1C:
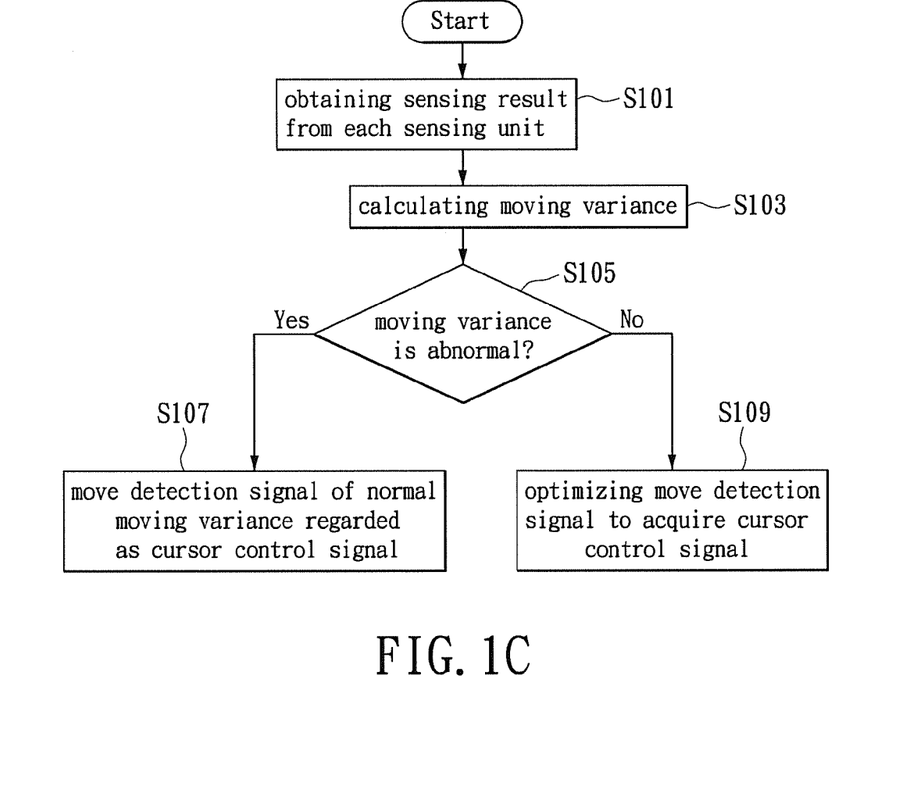
FIG. 1C is a flow chart illustrating the determination of the moving computer mouse in accordance with the present invention.

The way the control unit 40 performs the analysis and operates the signal processing of the two sets of move detection signals may be referred to the description of FIG. 1C.

In the first step S101, the control unit 40 will receives the sensing signals from a first sensing unit 42 and/or second sensing unit 44 when the computer mouse 1' moves on a surface. The sensing signals such as first move detection signal and/or second move detection signal reflect the coordinates represented by x-axis and y-axis for the movement. The signals also record the initial position of the computer mouse 1'.

Next, in step S103, the control unit 40 respectively computes the moving variance of the computer mouse 1' from the first sensing unit 42 and the second sensing unit 44. The moving variance is indicative of position moving variance and/or directional variance. The position moving variance indicates the position of the computer mouse 1' after its movement and a displacement there-between from an initial position of the computer mouse 1'. Specifically speaking, the position moving variance and the directional change represent a slope variance. The slope variance shows an instantaneous variance between a slope of the computer mouse 1' before its move and another slope after its move.

In step S105, the control unit 40 determines whether or not the moving variance detected by the first sensing unit 42 and/or the second sensing unit 44 is abnormal. The determination of any abnormal moving is used to verify if the computer mouse's moving meets an object's inertial motion. If it is determined that the mouse's moving does not meet the inertial motion, it means the detection result from the sensing unit may show its abnormality. For example, the sensing unit may be negatively affected with contamination.

In an exemplary example, the way to determine the abnormality shown in step S105 is to compare the moving variance made by the sensing unit and a threshold. The moving variance is determined based on the computer mouse's directional moving variance.

For example, if the directional moving variance detected by any of the sensing units is larger than or equal to a threshold value, the variance is abnormal. On the contrary, if the directional moving variance is smaller than the threshold, the moving variance is determined normal. This moving variance may be represented by a slope change. When this slope change exceeds a threshold, it is determined that the moving variance made by one of the sensing units is abnormal. The mentioned threshold may be a fixed value or a variable.

In an exemplary example, if the computer mouse is detected to move in a linear motion, the threshold is a fixed value; if the computer mouse moves in an arcing motion or a polygonal motion, but not linear, the threshold is a variable. The way to define the threshold is based on the detection result from the sensing unit made by the control unit 40. Some other built-in judgment rules may be introduced to determining the computer mouse's move is linear or non-linear, and further to determining the corresponding threshold.

It is worth noting that, in step S105, the way to determine whether or not the directional moving variance meets the inertial motion is based on the comparison with the threshold. In which, the variance may be smaller than the threshold if the moving meets the inertial motion. However, the present invention may not be limited to the described determination since some other methods other than the slope change may also be incorporated to determining whether the computer mouse's moving meets the inertial motion.

If the determination in step S105 is "yes", the method goes to step S107 for the control unit 40 to abandon the move detection signals with abnormal moving variance. The determination of "yes" also shows the move detection signals with normal moving, exclusive of the abnormal signals, may be regarded as the cursor control signals. For example, such as the diagram shown in FIG. 1D, the distance variances T1a, T2a, and T3a are made by the first sensing unit 42 which detects the distance change made by the moving of computer mouse 1'. The shown position variances T1b, T2b, and T3b are generated by detecting the moving of the computer mouse 1' from the second sensing unit 44. To indicate an initial position of the computer mouse 1'.

Figure 1D:
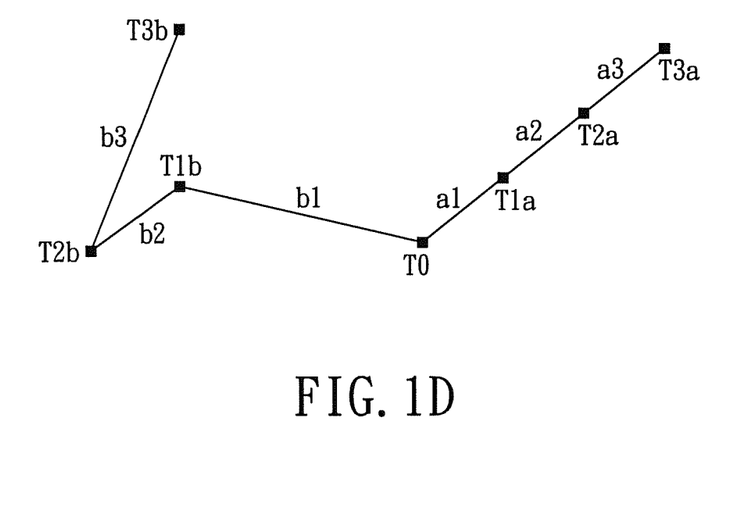
FIG. 1D shows the coordinates of location of the moving computer mouse in accordance with the present invention.

In FIG. 1D, the sequential changes indicative of T0, T1a, T2a, and T3a represent the computer mouse's linear motion which is detected by the first sensing unit 42. Exemplarily, a slope a1 is between T0 and T1a; a slope a2 is between T1a and T2a; and a slope a3 is between T3a and T2a. It is therefore determined that the computer mouse's move meets the inertial motion since both the changes of slope a2 from slope a1 and of slope a3 from slope a2 are smaller than the determined threshold. Therefore, by the control unit 40, the moving variance detected by the first sensing unit 42 is regarded as normal.

On the other hand, the moving variances indicative of the sequential points T0, T1b, T2b, and T3b made by the second sensing unit 44 represent the non-linear moving computer mouse 1'. Exemplarily, a slope b1 is between the points T0 and T1b; a slope b2 is between the points T1b and T2b; and a slope b3 is between the points T3b and T2b. In a very short period of time, the variances among the adjacent slopes b1, b2, and b3 show up-and-down jiggling according to the determination of the changes among the slopes. This moving of the computer mouse does not meet the inertial motion since the changes of slope b2 from slope b1 and of slope b3 from slope b2 are larger than the threshold. In the meantime, the control unit 40 regards the moving variance detected by the second sensing unit as abnormal. The control unit 40 may therefore abandon the second move detection signal made by the second sensing unit 44, and the first move detection signal made by the first sensing unit 42 may be regarded as the cursor control signal.

In step S105, when it is determined that the moving variance is normal (no), the method goes to step S109. The control unit 40 meanwhile optimizes the move detection signal made by each sensing unit, and generates the cursor control signal. It is noted that, when both the two sets of move detection signals are normal, the control unit 40 performs the optimization based on the multiple move detection signals for generating more accurate cursor control signal and as well obtaining the real movement of the computer mouse. In an exemplary example, the control unit 40 acquires the displacement information indicative of coordinates with x-axis and y-axis, namely the Reported Tracking, from the two sensor units. Next, using a statistical method, the acquired displacement information may be substituted into the algorithms including a Linear Regression model and trigonometric function so as to make a linear estimation. Further, some other methods, such as MSE (Mean Square Error), MAD (Mean Absolute Error), and SAD (Sum of Absolute Error), may also be incorporated to perform the analysis so as to optimize the accuracy. It is noted that the generation of mentioned cursor control signal has been described in the conventional technology. It is also noted that the above mentioned algorithms conveyed to compute the cursor control signal will not limit the present invention.

When the two sensing units (2, FIG. 1A) of the computer mouse merely operate under an operating mode with one action, the user may decide one of the modules 2 to operate and stop the other one. Since the two sensing units 2 are disposed one after the other, they may detect different displacements while the computer mouse is moved around a fixed point by the user. For example, when the user may select the sensing unit 2 which is farther from the fixed point (e.g. rear one) as manipulating the computer mouse, the reaction relative to the one closer to the fixed point can be more sensitive and faster.

A software configuration, button, or switching may be incorporated into generating a switching command to the control unit 40 for determining one of the operating modes of the sensing units (2). Accordingly, the control unit 40 determines the operating mode of the sensing unit (2) in response to the switching command.

Figure 1E:
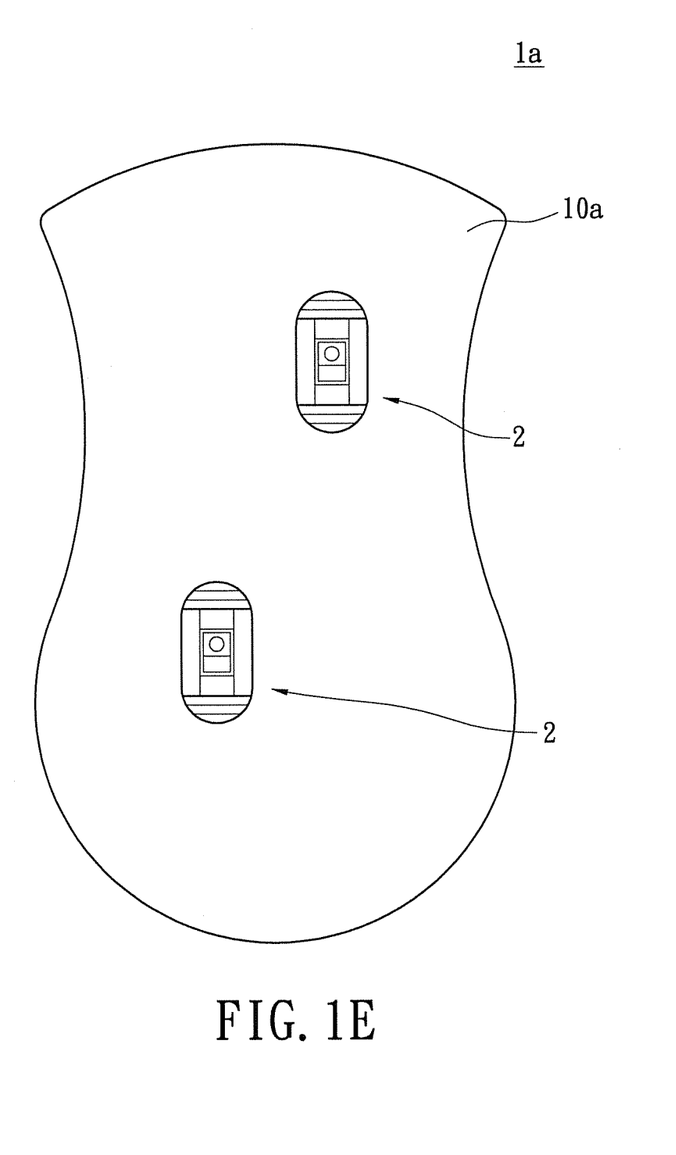
FIG. 1E shows another schematic diagram of a computer mouse in one embodiment of the present invention.
Figure 1F:
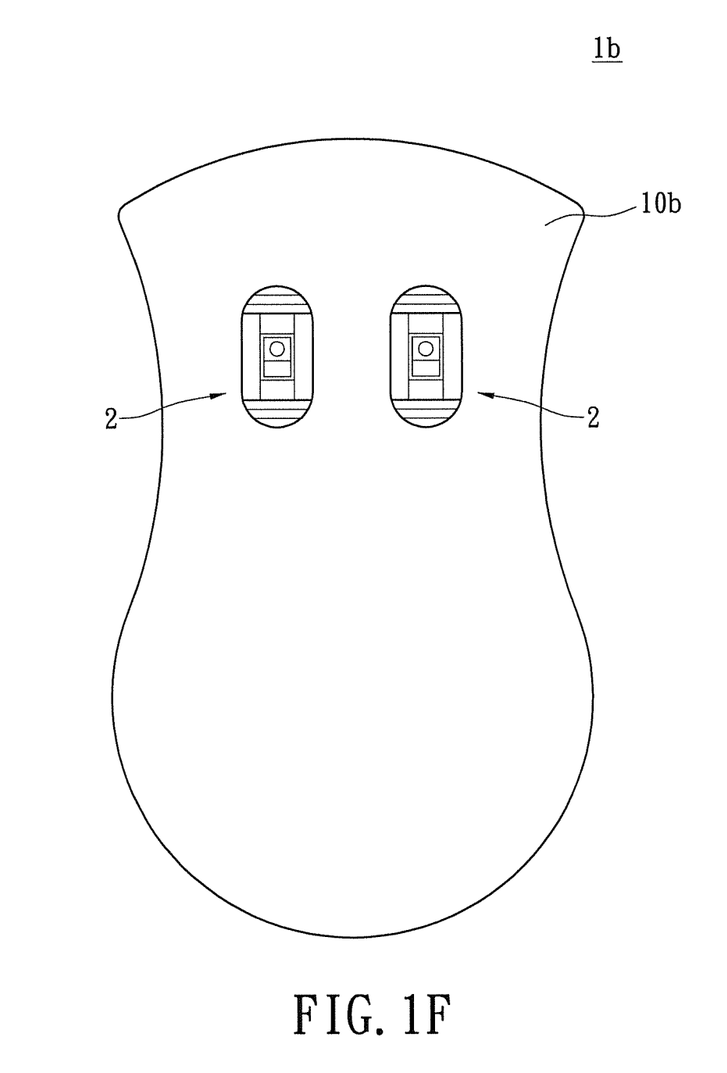
FIG. 1F shows one further diagram of a computer mouse in one embodiment of the present invention.

The implement of invention is not limited to the mentioned number of the sensing units (2) of the computer mouse. Furthermore, the sensing units 2 may be positioned at the diagonal corners of the casing 10a of the computer mouse shown in FIG. 1E. The computer mice shown in FIG. 1F are alternatively disposed at respective left and right sides of the casing 10b.

The computer mouse in accordance with another one embodiment of the present invention allows the user to adjust the position of the sensing units 2 by shifting. The adjustment of the position of the module 2 is to conform to user's need. The following description of the exemplary embodiments describes the structure allowing the user to adjust the position of the sensing unit of the computer mouse.

Figure 2:
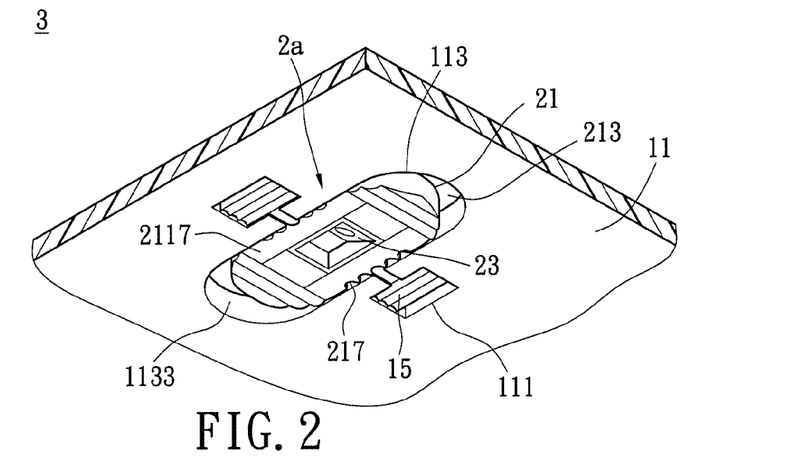
FIG. 2 schematically shows the composition of a sensor unit of computer mouse in one embodiment of the present invention.

Reference is made to FIG. 2 schematically showing the composition of photo sensor of the computer mouse in accordance with the first embodiment of the present invention.

A photo sensor unit 3 of the computer mouse is particularly shown in the diagram. This sensor unit 3 is the assembly of the shown sensing module 2a and the casing 11, and is provided to allow the sensing module 2a to slide over the casing 11. The currently mentioned casing 11 is exemplarily described with a bottom portion.

Figure 3:
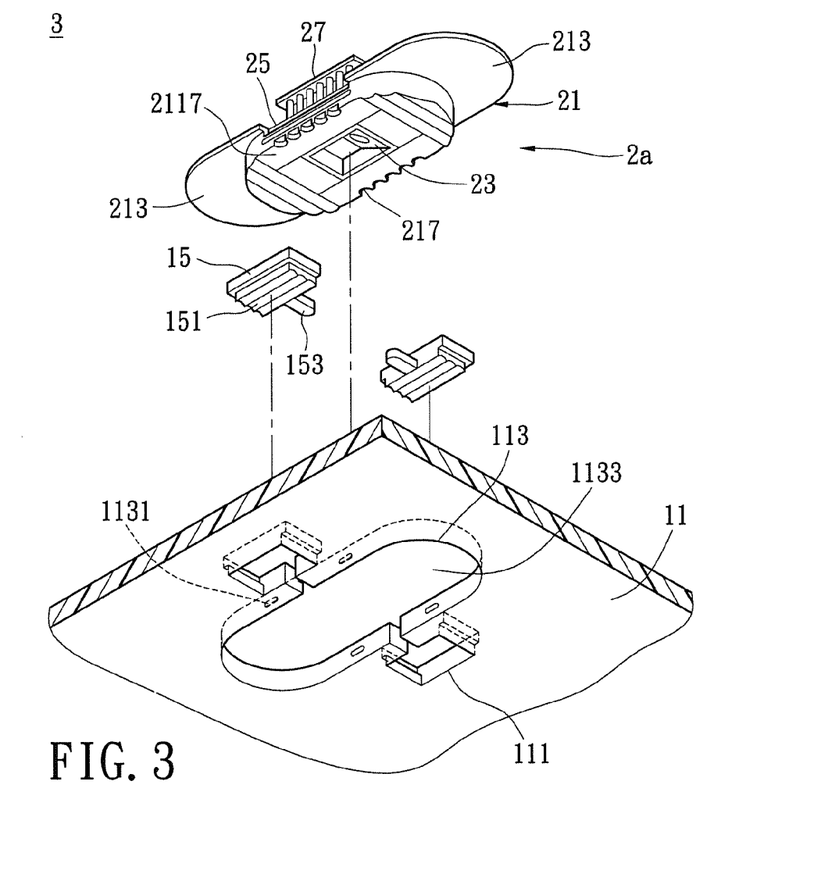
FIG. 3 schematically shows an exploded view of the sensor unit of computer mouse of first embodiment of the invention.
Figure 4:
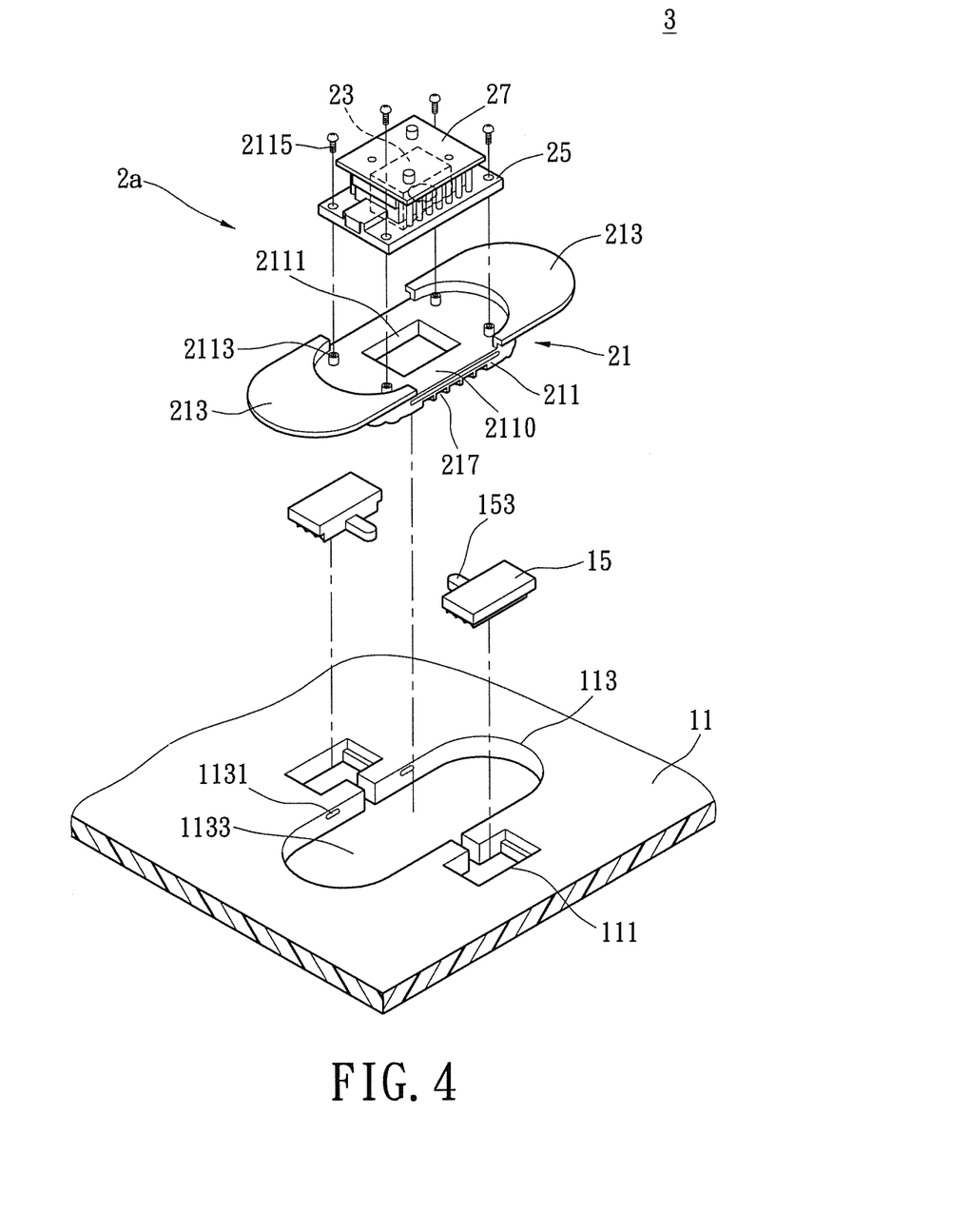
FIG. 4 schematically shows one further exploded view of the sensor unit of one embodiment of the present invention.

Further references are made to FIG. 3 and FIG. 4, in view of FIG. 2. The figures schematically show the compositions of the sensor unit of the computer mouse of first embodiment in the invention.

The portion of shown sensing module 2a includes a sliding board 21, a substrate 25, a lens set 23, and a sensor chip 27. The lens set 23 and the sensor chip 27 are respectively disposed upon the substrate 25. The sensor chip 27 outputs light signal and receive the reflection through the lens set 23. However, the technologies related to the substrate 25, the lens set 23, and the sensor chip 27 may be referred to the currently developed arts. The described sensor chip 27 may be implemented with an optical sensor chip or a laser sensor chip.

The sliding board 21 primarily includes a containing member 211 and a shelter member 213. The shelter member 213 is an extension of slice structure of the containing member 211. For example, two sides of the containing member 211 are respectively extended to the two slice structure. A loading surface 2110 of the containing member 211 is provided for disposing some elements preferably including the substrate 25, the lens set 23, and the sensor chip 27. A perforating member 2111 is further formed adjacent to the lens set 23 of the containing member 211 and the substrate 25.

Furthermore, at least one side of the containing member 211 is disposed with a position-restricted member 217. The position-restricted member 217 is, but not limited to, exemplarily constituted of a plurality of position-restricted slots. A light-emitting surface 2117 of the containing member 211 is formed as the structure with a non-slipping surface. The non-slipping surface may be implemented as non-slipping stripes or non-slipping points. The described light-emitting surface 2117 and the loading surface 2110 are respectively disposed at two opposite sides of the containing member 211.

Thus, the substrate 25 is fixed and coupled to the sliding board 21 and allowing the substrate 25 to shift relative to the movement of the sliding board 21. In an exemplary example, a plurality of screw holes are disposed on the substrate 25, and the related screw posts 2113 are relatively disposed on the containing member 211. The screws 2115 may therefore be connected to the screw posts 2113 via the screw holes on the substrate 25. The substrate 25 is then fixed in the containing member 211. The mentioned fixing matter between the substrate 25 and the sliding board 21 may not limit the embodiments of the invention. Any possible fixing means, such as locking, welding, or adhesive bonding, and the like, may also be used to implement the fixing.

Still further, a sliding member 113 and a positioning member are disposed on the casing 11. The sliding member 113 allows the sensing module 2a to be slidable over the casing 11. The positioning member is particularly used to define the sliding position of the sensing module 2a on the sliding member 113.

The sliding member 113 is exemplarily an opening member 1133 formed on the casing 11. The area of the opening member 1133 is preferably larger than the bottom area of the containing member 211 of the sensing module 2a. Therefore, the opening member 1133 of the containing member 211 may provide a shifting space. The side of the opening member 1133 may be disposed with some locking points 1131, which are used to lock the sensing module 2a onto the casing 11. The sensing module 2a may not fall off and slide over the sliding member 113. The described way to fix the sensing module 2a to the casing 11 may not be limited to the above description using the locking point 1131. Some other schemes including disposal of sliding track and sliding slot may be introduced.

The positioning member is adjacent to the sliding member 113. The positioning member is exemplarily connected to the position-restricted member 217 in the containing member 211 in the opening member 1133. The sensing module 2a is therefore positioned while sliding over the sliding member 113. The positioning member is mechanically implemented as a locking member 15. The locking member 15 disposed in the positioning slot 111 of the casing 11 is to lock the position-restricted member 217. The surface of locking member 15 may be treated with the structure such as a non-slipping surface 151. This non-slipping surface 151 may be implemented as non-sliding stripes or non-sliding points. The positioning slot 111 is exemplarily formed aside the opening member 1133.

Movement of the locking member 15 may be used to control whether or not the locking member 15 in the positioning slot 111 is locked with the position-restricted member 217. The locking member 15 may be moved by directly applying a shifting force to adjust the position of the locking member 15 on the positioning slot 111. Alternatively, an elastic element may be introduced to dispose in the midst of the locking member 15 and the positioning slot 111. Without any application of additional force, the locking member 15 may be locked with the position-restricted member 217 by means of elastic force provided by the elastic element. While a shifting force is applied to the locking member 15, the locking member 15 may be fell off from the position locked with the position-restricted member 217.

Figure 5:
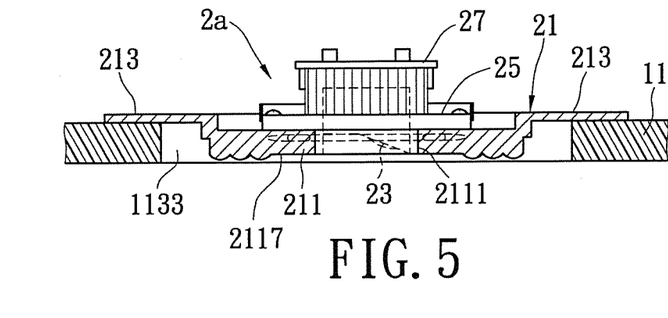
FIG. 5 is a cross-sectional view of the sensor unit of the computer in the first embodiment of the invention.
Figure 6:
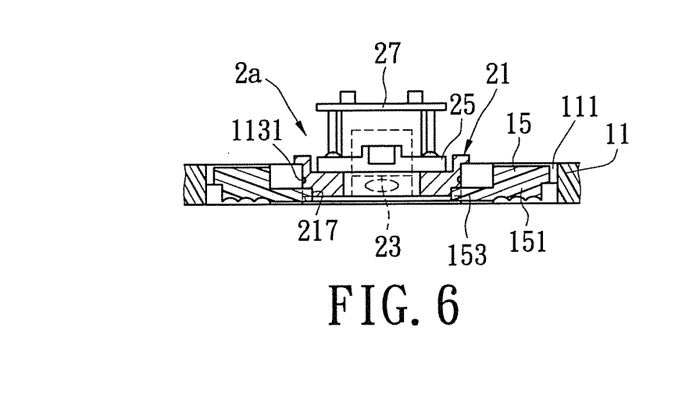
FIG. 6 is another cross-sectional view of the sensor unit of the computer mouse of the first embodiment of the invention.

References are made to FIG. 5 and FIG. 6. Two separate cross-sectional views of the sensor unit of the computer in accordance with the first embodiment of the present invention are described.

While the sensing module 2a is connected with the sliding member 113 of the casing 11, the shelter member 213 of the sensing module 2a is an extension portion adjacent to the casing 11. The containing member 211, in the meanwhile, is at the position of opening member 1133. The containing member 211 is slidable in the opening member 1133, and the shelter member 213 may be used to cover the chink between the containing member 211 and the casing 11.

Figure 7:
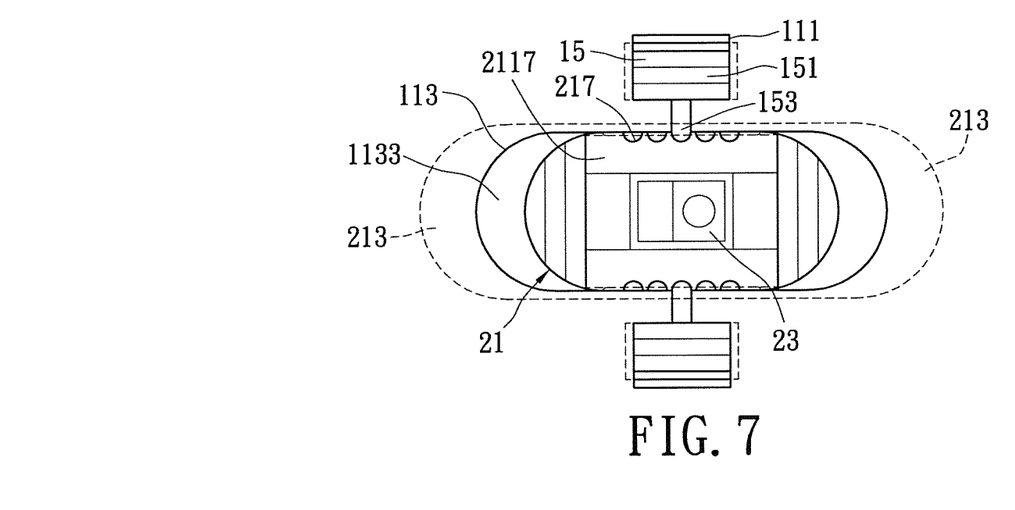
FIG. 7 schematically shows a part of the sliding structure of the photo-sensor of the computer in accordance with the present invention.

The following exemplarily describes the movement between the sensing module 2a and the positioning member. Reference is made to FIG. 7 showing a schematic diagram of part of the sensor unit of the computer mouse of the first embodiment.

The position-restricted members 217 at two sides of the light-emitting surface 2117 of the containing member 211 are locked to the positioning member. For example, a protruding post 153 of the locking member 15 is scarfed to one of the position-restricted slots of the position-restricted member 217. Since the position of the sensing module 2a is adjusted, the protruding post 153 can be deviated from the position-restricted slot by pushing away the locking member 15. Next, the locking member 15 may be restored and the protruding post 153 is again locked to the other one position-restricted slot since the sensing module 2a is moved to the desired position.

Figure 8:
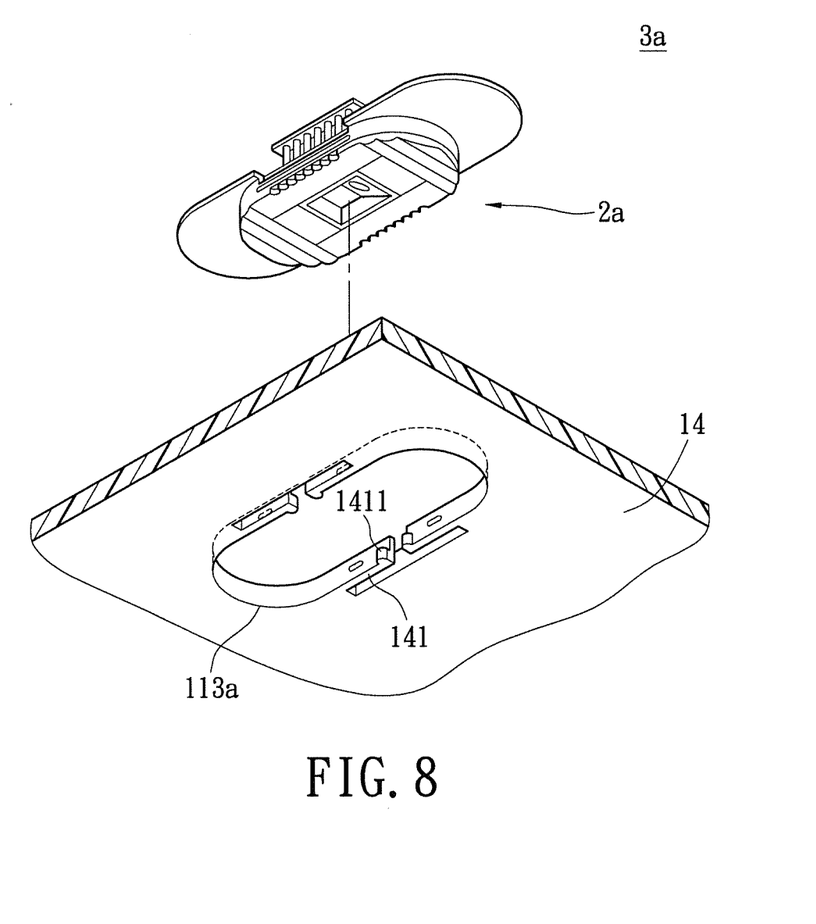
FIG. 8 shows an exploded view of the sensor unit of the computer mouse of a second embodiment of the present invention.

FIG. 8 describes a schematic exploded diagram of the sensor unit of the computer mouse of the present embodiment of the present invention.

The shown sensor unit 3a is the assembly of the sensing module 2a and a casing 14. The sensing module 2a is slidable over the casing 14 back and forth.

The shown sensing module 2a is exemplarily described in the first embodiment. The sliding member 113a on the casing 14 forms a positioning member on a position adjacent to the position-restricted member of the sensing module 2a. The positioning member is formed as an elastic arm 141. The connection between the elastic arm 141 and the position-restricted slot of the position-restricted member forms a protruding part 1411. While the position of sensing module 2a is adjusted, the elastic arm 141 may be compressed to pushing away the protruding part 1411 from the position-restricted slot. The sensing module 2a is then slided to the desired position. After that, the elastic arm 141 is released and the protruding part 1411 of the elastic arm 141 is again locked with another position-restricted slot.

The sensor unit 3a of the embodiment described in FIG. 8 is provided with another way to move the sensing module 2a rather than the sensor unit 3 in the embodiment described in FIG. 3. The rest related detail is similar with the first embodiment.

With the foregoing description, it is noted that the plurality of sensing units disposed in the computer mouse allow the user to flexibly manipulate the device. The sensing units may provide more accurate detection of the move, and as well eliminate the interface to the computer mouse made by the dirt. Or, the mechanical design may be used to slide the position of the sensing unit, and the moving speed of the computer mouse can be in compliance with the personal need.

Furthermore, the scheme having the plurality of sensing units disposed into the computer mouse is able to prevent interference from contamination since the sensing units may determine the abnormal shifting information. The two or more sensing units disposed in the computer mouse provide the more accurate and faster move through the described algorithm. Still further, the two or more optical sensing units are also slidable.

Rather, the sensor unit in accordance with the present invention may also adopt single sensing unit in the computer mouse. The variant changes of the slidable one or more sensing units provide the various embodiments of the present invention.

While the invention has been described by means of a specification with accompanying drawings of specific embodiments, numerous modifications and variations could be made thereto by those skilled in the art without departing from the scope and spirit of the invention set forth in the claims.

What is claimed is:

1. An indexing device, comprising:
    a first sensing unit, generating a first move detection signal;
    a second sensing unit, generating a second move detection signal;
    a control unit, coupled with the first sensing unit and the second sensing unit; and
    a positioning member;
    wherein the control unit operates to generate a cursor control signal in response to a variance of the first move detection signal and/or the second move detection signal;
    wherein one of the first sensing unit and second sensing unit comprises:
        a sliding member, disposed on a casing of the device,
        an opening member formed on the sliding member, and
        a sensing module, slidably disposed on the sliding member;
    wherein the sensing module outputs a light signal through the opening member for detecting a movement of the casing;
    wherein the sensing module comprises:
        a substrate;
        a lens set, disposed on the substrate, directed toward the opening member;
        a sensor chip, disposed on the substrate, adjacent to the lens set; and
        a sliding board, connected with the substrate, slidably connected with the sliding member;
    wherein the sensor chip outputs the light signal through the lens set to the opening member;
    wherein the sliding board comprises:
        a containing member for containing the substrate, the lens set, and the sensor chip, adjacent to the positioning member; and
        a shelter member, extending to the outside of the containing member and contacted with the casing, for sheltering the opening member between the containing member and the casing;
    wherein the containing member has a perforating member directed toward the opening member and is formed corresponding to the lens set; and
    wherein the positioning member is disposed at one side of the sliding member for positioning the sensing module on the sliding member.

2. The indexing device of claim 1, wherein the control unit generates the cursor control signal through an analytic operation based on the variances corresponding to the first move detection signal and the second move detection signal.

3. The indexing device of claim 2, wherein the analytic operation performed by the control unit is an algorithm such as Linear Regression model, trigonometric function for linear estimation, Mean Square Error, Mean Absolute Error, or Sum of Absolute Error, so as to compute the cursor control signal accurately.

4. The indexing device of claim 1, wherein, when the control unit determines that one of the first move detection signal and the second move detection signal is abnormal, the control unit regards the normal move detection signal exclusive of the abnormal signal as the cursor control signal.

5. The indexing device of claim 4, wherein the determination of the first move detection signal or the second move detection signal being abnormal is made by the control unit based on whether or not the moving variance detected by the first sensing unit or the second sensing unit is larger than a threshold value.

6. The indexing device of claim 1, wherein the control unit controls one or both the first sensing unit and second sensing unit to be operated according to a switching command.

7. The indexing device of claim 1, wherein at least one of the first sensing unit and the second sensing unit is slidably disposed on a casing of the indexing device.

8. The indexing device of claim 1, wherein, a position-restricted member is disposed at one side adjacent to the containing member and positioning member, and the position-restricted member is collocated to the positioning member for positioning the sensing module on the sliding member.

9. The indexing device of claim 8, wherein the positioning member is an elastic arm having an end forming a protruding part embedded to the position-restricted member.

10. The indexing device of claim 1, wherein, a non-slipping surface is formed on a light-emitting surface of the containing member.

11. The indexing device of claim 1, wherein the positioning member is a lock.

* * * * *